United States Patent Office 3,325,542
Patented June 13, 1967

3,325,542
CARBAMYL PHOSPHORANES
Angelo John Speziale and Kenneth Wayne Ratts, Creve Coeur, Mo., assignors to Monsanto Company, St. Louis, Mo., a corporation of Delaware
No Drawing. Filed Mar. 28, 1966, Ser. No. 537,668
20 Claims. (Cl. 260—558)

This application is a continuation-in-part of copending application Ser. No. 482,905, filed Aug. 26, 1965, and now abandoned, which in turn is a continuation-in-part of application Ser. No. 195,986, filed May 18, 1962, and now abandoned.

This invention relates to a new class of phosphorus containing amides and more particularly to phosphoranes and processes for their preparation from carbamylhalomethyl trisubstituted phosphonium halides.

The novel phosphoranes of this invention are represented by the formula

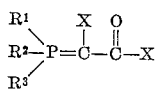

wherein $R^1$, $R^2$, and $R^3$ are each selected from the group consisting of phenyl, cyclohexyl, alkyl of not more than 6 carbon atoms, alkenyl of not more than 6 carbon atoms and alkynyl of not more than 6 carbon atoms, X is halogen (Cl, Br and I), and Y is selected from the group consisting of

wherein $R^4$ and $R^5$ are each selected from the group consisting of hydrogen, phenyl, cyclohexyl, alkyl of not more than 6 carbon atoms, alkenyl of not more than 6 carbon atoms and alkynyl of not more than 6 carbon atoms, and

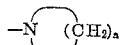

wherein $a$ is an integer from 4 to 7, inclusive.

In the above formula the alkyl, alkenyl and alkynyl of $R^1$, $R^2$, $R^3$, $R^4$, and $R^5$ can be for example, methyl, ethyl, n-propyl, isopropyl, n-butyl, isobutyl, sec-butyl, tert-butyl, amyl, hexyl and the like; vinyl allyl n-butenyl 2-butenyl, n-pentenyl 3-pentenyl, n-hexenyl, 2-methyl-3-butenyl, 2-methyl-3-pentenyl and the like, and propargyl and the various homologues and isomers of alkenyl having not more than 6 carbon atoms.

In the above formula the group

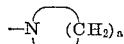

represents pyrrolidyl, piperidyl, hexamethyleneimino and heptamethyleneimino.

The process of the invention is carried out by reacting a phosphonium halide of the formula

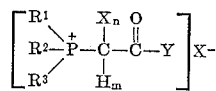

with an alkaline material in the presence of an inert liquid medium, wherein $R^1$, $R^2$, $R^3$, Y and X are as defined above, $n$ is an integer form 1 to 2 inclusive, $m$ is an integer from 0 to 1 inclusive, and the sum of $n+m$ is two.

Alkaline materials which can be used in the process of this invention include, for example, inorganic bases such as the alkali metal and alkaline earth metal hydroxides, hydrides and carbonates, organic bases such as alcoholates and phenylithium, and other organic and inorganic bases. Specific examples of suitable alkaline materials include sodium hydroxide, calcium hydroxide, potassium hydroxide, sodium carbonate, calcium carbonate, sodium hydride, lithium hydroxide, sodium ethylate, potassium ethylate, phenyllithium and the like. The process is usually carried out in the presence of an inert aqueous or alcoholic medium when inorganic alkaline materials are employed and in the presence of an inert organic medium when organic alkaline materials are employed. Suitable inert liquid media include water, primary aliphatic alcohols and tetrahydrofuran.

The process is usually carried out at room temperature (20° C.). However, temperatures from about 0° C. to about 30° C. can be employed. The phosphonium halides used in the process of this invention can be prepared by the processes disclosed and claimed in U.S. Patent Nos. 3,157,701 and 3,187,043, the teachings of which are incorporated herein by reference.

The following examples will serve to illustrate the invention. Parts and percent are by weight unless otherwise indicated.

Example 1

N,N-diphenylcarbamyl dichloromethyl triphenylphosphonium chloride was dissolved in water containing an equivalent amount of sodium carbonate at a temperature maintained between 10° C. and 20° C. by means of an ice bath. A yellow solid precipitate was formed. The suspension was filtered and the precipitate dissolved in chloroform. The chloroform solution was dried over magnesium sulfate and an excess of hexane added. A 35% yield of N,N-diphenylcarbamyl chloromethylene triphenylphosphorane was recovered as a solid precipitate.

Example 2

A suitable reaction vessel was charged with 5.4 grams of N,N-diphenylcarbamyl chloromethyl triphenylphosphonium chloride and 1000 ml. of water. To the reaction mixture was then added 40 ml. of 0.5 N sodium hydroxide aqueous solution while maintaining the temperature between 15 and 25° C. The precipitate which formed was recovered and identified by infrared spectrum as identical to that of Example 1, N,N-diphenylcarbamyl chloromethylene triphenylphosphorane.

Examples 3 to 10

Following the procedures of Example 1, other carbamyldihalomethyl trisubstituted phosphonium halides were reacted with strong alkaline materials in the presence of inert liquid media to prepare the following compounds of this invention:

Example
3   N,N-di-n-butylcarbamyl chloromethylene tricyclohexylphosphorane
4   Carbamyl chloromethylene triethylphosphorane
5   N,N-diallylcarbamyl chloromethylene triphenylphosphorane

| | |
|---|---|
| 6 | N(6-aminohexyl)carbamyl chloromethylene tri-n-butylphosphorane |
| 7 | N,N-dicyclohexylcarbamyl bromomethylene trimethylphosphorane |
| 8 | N,N-propargylcarbamyl iodomethylene triphenylphosphorane |
| 9 | N,N-diphenylcarbamyl chloromethylene tri-n-butynylphosphorane |
| 10 | Carbamyl bromoethylene triallylphosphorane |

*Examples 11 to 18*

Following the procedure of Example 2 except with different carbamylhalomethyl trisubstituted phosphonium halides and other alkaline materials, the following compounds of this invention are prepared:

| Example | |
|---|---|
| 11 | N,N - dicyclohexylcarbamyl chloromethylene tripropylphosphorane |
| 12 | N,N-diphenylcarbamyl bromomethylene tripropargylphosphorane |
| 13 | N,N - dimethallylcarbamyl chloromethylene triphenylphosphorane |
| 14 | N,N - dipentenyl iodomethylene triallylphosphorane |
| 15 | N,N-dihexynylcarbamyl chloromethylene triethylphosphorane |
| 16 | N-(6-aminohexyl)carbamyl chloromethylene tri-n-butenylphosphorane |
| 17 | Carbamyl bromoethylene tripropargylphosphorane |
| 18 | N,N - dipropylcarbamyl chloromethylene tricyclopentylphosphorane |

The phosphoranes of this invention are useful intermediates in the preparation of α-haloacetamides by the procedures disclosed in application Ser. No. 195,974, filed May 18, 1962, and now abandoned. Most of these α-haloacetamides are also disclosed in published literature. All of these α-haloacetamides have useful biocidal properties, particularly the N-substituted α-haloacetamides which are known to have herbicidal properties of commercial significance. The phosphoranes of this invention are also useful per se as fire retardants and rust inhibitors, and as chemical intermediates in the preparation of petroleum additives and other products of commercial interest.

Although the invention is described with respect to the above specific examples, it is not intended that the details thereof shall be limitations on the scope of the invention except to the extent incorporated in the following claims.

What is claimed is:

1. Compound of the formula

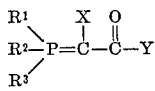

wherein $R^1$, $R^2$ and $R^3$ are each selected from the group consisting of phenyl, cyclohexyl, alkyl of not more than six carbon atoms, alkenyl of not more than six carbon atoms and alkynyl of not more than six carbon atoms, X is selected from the group consisting of chlorine, bromine and iodine, and Y is selected from the group consisting of

wherein $R^4$ and $R^5$ are each selected from the group consisting of hydrogen, phenyl, cyclohexyl, alkyl of not more than 6 carbon atoms, alkenyl of not more than six carbon atoms and alkynyl of not more than six carbon atoms, and

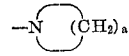

wherein $a$ is an integer from 4 to 7, inclusive.

2. Compound of claim 1 which is N,N-di($C_1$-$C_6$)alkylcarbamyl chloromethylene triphenylphosphorane.

3. Compound of claim 1 which is N,N-diphenylcarbamyl chloromethylene tri($C_1$-$C_6$)alkylphosphorane.

4. Compound of claim 1 which is N,N-diallylcarbamyl chloromethylene triphenylphosphorane.

5. Compound of claim 1 which is N,N-diphenylcarbamyl bromomethylene tripropargylphosphorane.

6. Compound of claim 1 which is N,N-diphenylcarbamyl chloromethylene tri-n-butynylphosphorane.

7. Compound of claim 1 which is N,N-dicyclohexylcarbamyl bromomethylene trimethylphosphorane.

8. Compound of claim 1 which is N,N-dimethallylcarbamyl chloromethylene triphenylphosphorane.

9. Compound of claim 1 which is N,N-diphenylcarbamyl chloromethylene triphenylphosphorane.

10. Process for the preparation of a compound of the formula

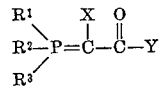

wherein $R^1$, $R^2$, and $R^3$ are each selected from the group consisting of phenyl, cyclohexyl, alkyl of not more than six carbon atoms, alkenyl of not more than six carbon atoms and alkynyl of not more than six carbon atoms, X is selected from the group consisting of chlorine, bromine and iodine, and Y is selected from the group consisting of

wherein $R^4$ and $R^5$ are each selected from the group consisting of hydrogen, phenyl, cyclohexyl, alkyl of not more than 6 carbon atoms, alkenyl of not more than six carbon atoms and alkynyl of not more than six carbon atoms, and

wherein $a$ is an integer from 4 to 7, inclusive, which comprises reacting a phosphonium halide of the formula

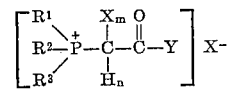

wherein $m$ is an integer from one to two inclusive, $n$ is an integer from zero to one, inclusive, and the sum of $n$ and $m$ is two, with an alkaline material in the presence of an inert liquid medium at a temperature from about 0° C. to about 30° C.

11. Process of claim 10 wherein the phosphonium halide is N,N-di($C_1$-$C_6$)alkylcarbamyl dichloromethyl triphenylphosphonium chloride.

12. Process of claim 10 wherein the phosphonium halide is N,N-di($C_1$-$C_6$)alkylcarbamyl chloromethyl trialkylphosphonium chloride.

13. Process of claim 10 wherein the alkaline material is sodium hydroxide and the inert liquid medium in an aqueous medium.

14. Process of claim 10 wherein the phosphonium halide is N,N-diallylcarbamyl dichloromethyl triphenyl phosphonium chloride.

15. Process of claim 10 wherein the phosphonium halide is N,N-diphenylcarbamyl chloromethyl tripropargylphosphonium chloride.

16. Process of claim 10 wherein the phosphonium halide is N,N-diphenylcarbamyl dichloromethyl tri-n-butynylphosphonium chloride.

17. Process of claim 10 wherein the phosphonium halide is N,N-dicyclohexylcarbamyl dibromomethyl triphenylphosphonium bromide.

18. Process of claim 10 wherein the phosphonium halide is N,N-dimethallylcarbamyl chloromethyl triphenylphosphonium chloride.

19. Process of claim 10 wherein the phosphonium halide is N,N-diphenylcarbamyl chloromethyl triphenylphosphonium chloride.

20. Process of claim 10 wherein the phosphonium halide is N,N-diphenylcarbamyl dichloromethyl triphenylphosphonium chloride.

References Cited

UNITED STATES PATENTS 3,005,013   10/1961   Grayson et al. _____ 260—56?

OTHER REFERENCES

Trippet et al.: Jour. Chem. Soc., (London) 1959, pp. 3874–3876.

WALTER A. MODANCE, *Primary Examiner.*

NATALIE TROUSOF, *Assistant Examiner.*